Feb. 12, 1952          D. T. COLLINS          2,585,440
WATER SEALED AIR WASHER

Filed July 11, 1949                             2 SHEETS—SHEET 1

INVENTOR.
DANIEL T. COLLINS
BY
ATTORNEY

INVENTOR.
DANIEL T. COLLINS
BY
ATTORNEY

Patented Feb. 12, 1952

2,585,440

UNITED STATES PATENT OFFICE 2,585,440

WATER SEALED AIR WASHER

Daniel T. Collins, Ferndale, Mich.

Application July 11, 1949, Serial No. 104,059

1 Claim. (Cl. 261—111)

1

This invention relates to improvements in air-cleaners and washers and in particular to an improved air-cleaner and washer for separating airborne impurities such as dirt, dust, ash, etc., from air in industrial use or in geographical areas where the air is mixed with impurities.

The primary object of the invention is to provide an improved air cleaner or washer which is capable of heavy duty operation to remove all of the airborne impurities from the air regardless of the quantity of the dirt, dust, ash, etc., carried by the air.

An object of the invention is to provide a unitary air washer and cleaner that can be installed and set up with a minimum of on-the-job installation work at any desired place.

An object of the invention is to provide an air-cleaner and washer wherein the air bearing the impurities and the washing agent, or cleaning liquid are thoroughly mixed and integrated so that the washing liquid or cleaning agent picks up all the impurities from the air.

An object of the invention is to provide an air-cleaner and washer wherein the washed and cleaned air is effectively separated from the washing liquid and impurities.

An object of the invention is to provide an air-cleaner and washer with an impurity settling tank for separating the impurities from washing liquid after the washing liquid has acquired the impurities from the air.

An object of the invention is to provide an air-cleaner and washer wherein the washing liquid is recovered and reused.

An object of the invention is to provide an air-cleaner and washer wherein the impurity burdened air passes through the washing liquid and the washing liquid passes through the impurity burdened air to completely remove the impurities from the air and to completely capture all the impurities in the washing liquid.

An object of the invention is to provide a mixing stack or chamber to which the impurity burdened air is tangentially delivered and the washing liquid similarly angularly deflected to create a whirlpool or cyclone of air, impurities and washing liquid.

An object of the invention is to provide baffles in the stack to effect a sinuous or tortuous path for the air, impurities, and washing liquid to follow in greater or lesser degree so that they pass through each other to effect a washing action.

An object of the invention is to provide a member occupying the central longitudinal area of the stack to prevent air, impurities, and washing liquid from occupying the central area of the cyclone in the stack so that air, dust, and washing liquid is channeled into the more active area of the cyclone.

Other objects of the invention will become apparent by reference to the following detailed description taken in connection with the accompanying drawings, in which.

Figure 1:
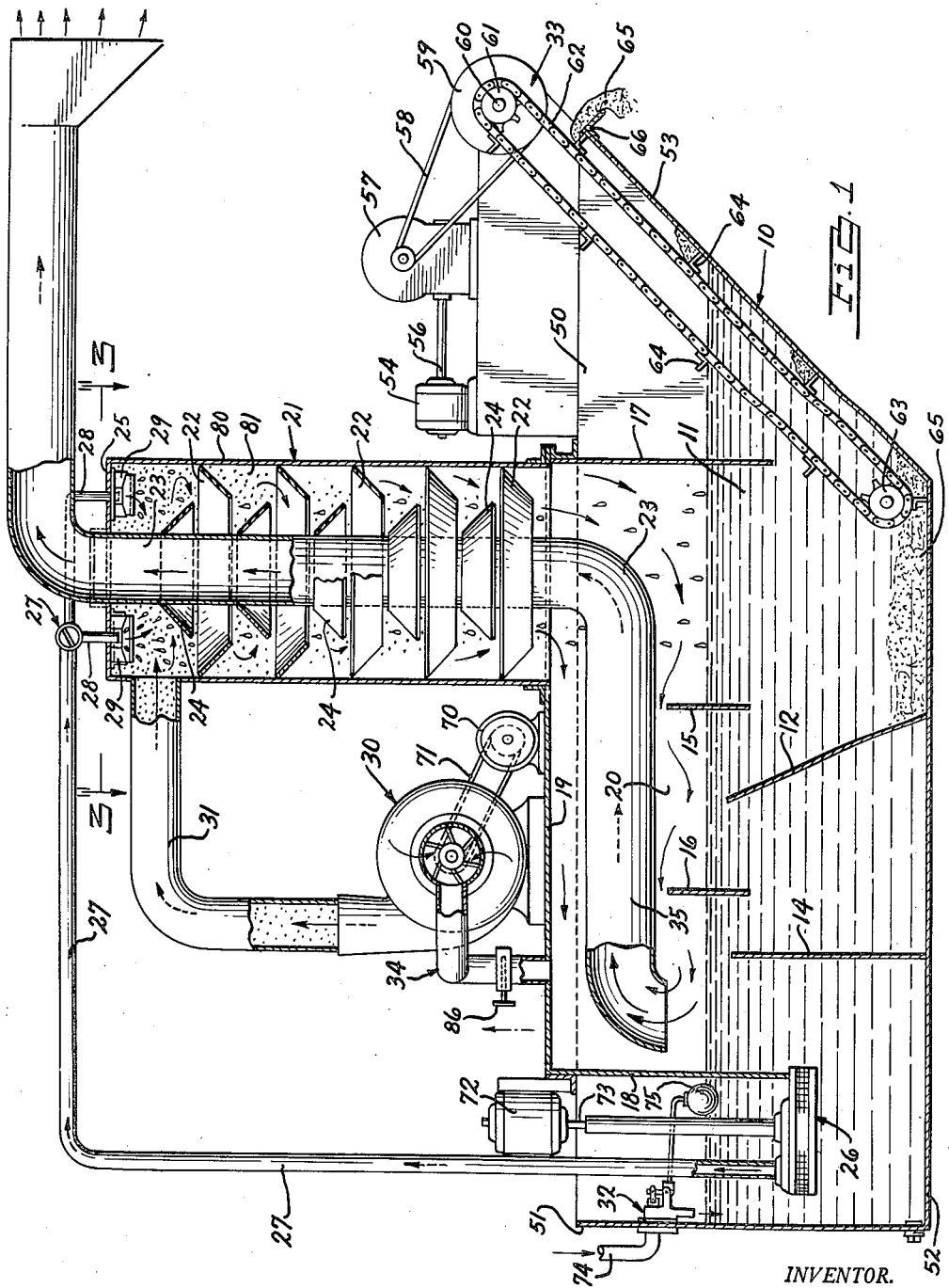
Fig. 1 is a vertical sectional view of the air-cleaner and washer of the invention with portions thereof shown in side elevation to better illustrate the invention.
Figure 2:
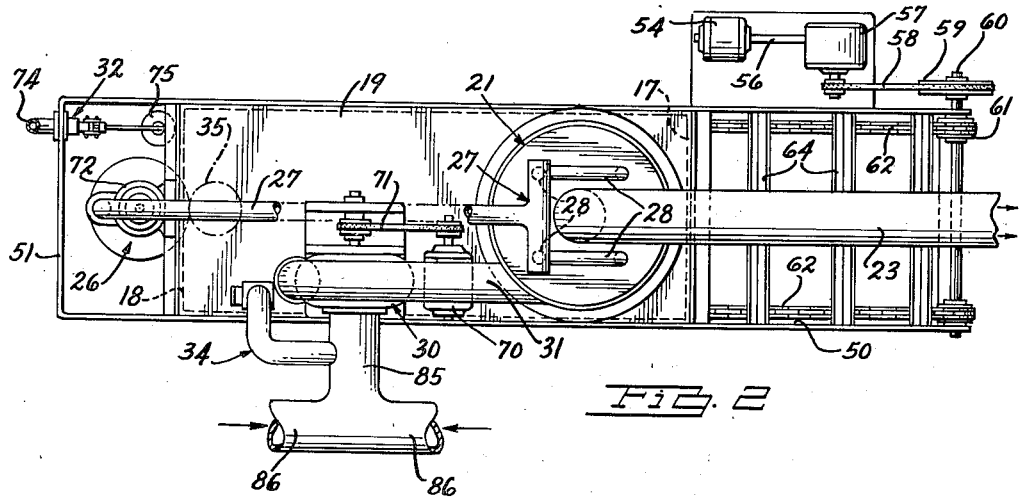
Fig. 2 is a top plan view of the invention.
Figure 3:
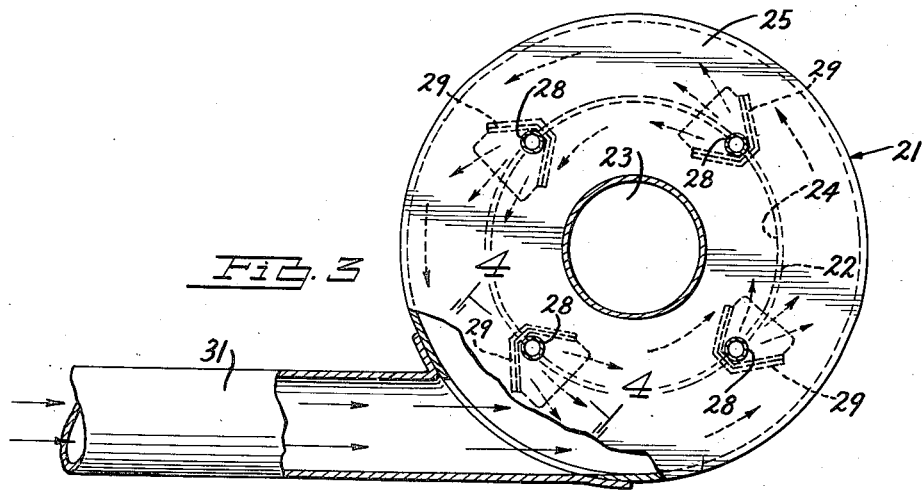
Fig. 3 is an enlarged top plan view of the stack with parts broken away to show their construction and disposition.
Figure 4:
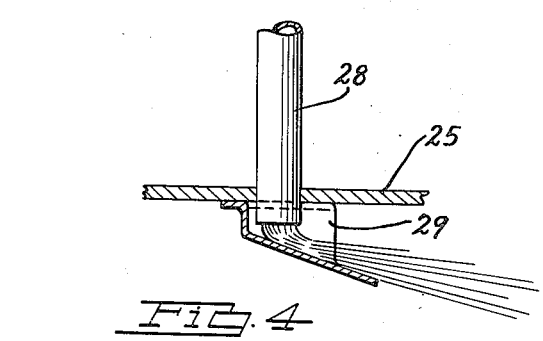
Fig. 4 is a cross-sectional view taken on the line 4—4 of Fig. 3 showing a manner of introducing the liquid into the stack.

Referring now to the drawing wherein like numerals refer to like and corresponding parts throughout the several views, the particular embodiment of the invention disclosed for the purpose of illustration comprises a tank 10 for containing the washing liquid or cleaning agent 11, sludge separating baffles 12 and 14, foam impeding baffles 15 and 16, air sealing baffles 17 and 18, air sealing hood 19; the air sealing baffles 17 and 18; the air sealing hood 19 together with the tank 10 enclosing and forming chamber 20 above the liquid 11 in the tank 10; a cleaning liquid, air, and dust mixing stack 21 communicating with the chamber 20, baffles 22 positioned on the internal periphery of the stack 21, a relatively smaller stack 23 centrally disposed within the stack 21, baffles 24 positioned on the external periphery of the stack 23 cooperating with the baffles 22, a cover 25 sealing the top of the stack 21, a pump 26 disposed in the liquid 11, a conduit 27 leading from the pump 26 to the top of the stack 21, a distributor 28 at the top of the stack 21 connected to the conduit 27 for introducing liquid carried by the conduit 27 into the stack 21 via multiple nozzles 28, deflectors 29 for directing the introduced liquid sidewise or tangentially of the stack 21, a blower 30 providing suction for picking up dust and impurity burdened air and providing pressure to deliver the dust and air, a duct 31 leading from the blower 30 to the top of the stack 21 and entering the stack 21 tangentially, that is, at the side thereof, to deliver air and impurities to the stack 21 at an angle thereto, a float valve 32 for maintaining the liquid 11 level in the tank 10, a conveyor 33 for removing the sludge from the tank 10, a valved bleeder duct 34 for optionally slowing the rate of introduction of air and dust to the stack 21; the internal stack 23 together with lead duct 35 optionally constituting a clean and washed air vent to atmosphere.

Referring in more detail to the invention, the tank 10 is composed of sides 50, a perpendicular end wall 51, bottom 52 and a sloping end wall 53 with the conveyor 33 positioned on the tank adjacent the sloping end wall 53 and including drive shaft 56 connected to reduction unit 57 which is drivingly connected by V-belt 58 to pulley 59 keyed on a conveyor drive shaft 60 carrying sprocket 61 driving endless chain 62 returnably disposed in the bottom of the tank 10 on sprocket 63 and carrying scrapers or bucket member 64 for conveying sludge 65 lying in the bottom of the tank in sliding relation along the sloping end wall 53 to the top of the tank where the sludge 65 is dumped at the edge 66 of the tank.

Motor 70 is mounted on the hood 19 over the tank and drivingly connected to the blower 30 via the V-belt 71 to the blower 30 while motor 72 is drivingly connected to the centrifugal pump 26 by shaft 73. The service connection 74 leads from supply to the float valve 32, which in conjunction with the float 75 buoyed on the surface of the liquid 11, maintains the proper level of the liquid 11 in the tank 10.

The stack 21 consists of an outer stack or shell 80 and an inner stack, shell or duct 23 axially positioned within the outer shell or stack 80 with the space between the shells 80 and 23 being optionally closed by the cover or closure 25. The baffles 22 are secured on the internal periphery of the shell 80 and extend inwardly and depend downwardly into the space between the shells 80 and 23 and are frustro-conical in configuration while the baffles 24 are mounted on the external periphery of the shell at 23 and extend outwardly and depend downwardly into the space between the shells 80 and 23 and are also frustro-conical in configuration.

The air, dust or dirt duct 31 leads into the shell 80 at the side thereof or tangentially thereto and disposed to deliver air and dirt into the space 81 internally of the shell 80 and at one side of the shell 23 with the shells 80 and 23 combining to channel the so-introduced air and dust into a downwardly spiraling and whirling helical path or cyclone for the air and dust while the baffles 22 and 24 inwardly and outwardly deflect the air and dust in its travel to cause the air and dust to follow a sinuous or tortuous path as it descends downwardly in the stack 21 into the chamber 20. The clean air duct 35 is connected to the internal shell 23 to optionally utilize the interior of the shell 23 as a duct for conveying the clean air from the chamber 20 to atmosphere.

The liquid 11 in the tank 10 is preferably water to which a suitable wetting agent, such as Aerosol O. T. is added; any commercial type cleaning fluid can be substituted instead of water if it is found desirable or advantageous.

The water or cleaning fluid 11 lies in the bottom of the tank 10 and is circulated by the pump 26 through the conduit 27 to the distributor nozzles 28 into the space or chamber between the outer shell or stack 21 and the inner shell or stack 23 where it comes in contact with the baffles 22 and 24 which impede the downwardly spiraling path of the water as injected into the chamber 81 causing the water or cleaning fluid to fall outwardly from the baffles 24 onto the baffles 22 and inwardly from the baffles 22 onto the baffles 24 in repeated falls until the water passes the plurality of baffles of 22 and 24 in the stack after which the water and the dirt or dust which it has absorbed from the air fall together through the chamber 20 onto the liquid 11 of the tank 10. Due to the swirling motion and falling action of the water in the chamber 81 and the absorption of the dust therein, the water becomes partially vaporized and somewhat frothy and as the froth is borne on top of the liquid 11 in the tank 10, the baffles 15 and 16 prevent the flow of the froth from the area of chamber 20 beneath the stack 21 to the area of chamber 20 adjacent the inlet to the clean air duct 35 thereby preventing any foam, suds or liquid from entering the clean air duct 35.

Due to the action of the wetting agent, the foam, suds or froth on the liquid quickly disintegrates and again due to the action of the wetting agent and the water, the previously airborne dust or dirt is wetted and falls to the bottom of the tank 10 and accumulates as sludge 65, which sludge 65 is separated from the liquid 11 by the sludge baffles 12 and 14 with the foam baffles 15 and 16 working in conjunction with the sludge baffles 12 and 14 to provide a sinuous path for the water adjacent the top level of liquid 11 in the tank 10 in its direction of flow towards the pump 26. After the sludge 65 has collected in the bottom of the tank, the conveyor 33 removes the sludge from the bottom of the tank and dumps it down into buckets or trucks stationed beneath the edge 65 of the tank 10.

Relative to the circulation of air and dust in the device, the blower intake 85 is optionally equipped with single or multiple leads 86 which can be disposed in dust laden areas such as adjacent cleaning or polishing machinery or the drying chambers of chemical reactions to draw the air and the air-borne dust therefrom and introduce it to the inventive apparatus via the blower 30 and the air and impurities duct 31 which leads tangentially into chamber 81 between the outer stack or shell 80 and the inner stack or shell 23. Due to the fact that the duct 31 leads tangentially into the chamber 81 the air and dust enters into the chamber 81 at an angle and as the chamber 81 is being sprayed or jetted with cleaning or washing liquid containing a wetting agent, the air, water and dust travel together initially in a helix or cyclone and ultimately the air and remaining dust descends in a tortuous or sinuous path as deflected inwardly between the baffles 22 against the baffles 24 and outwardly between baffles 24 against the baffles 22 and it will be noted that at each deflection from each baffle the air and dust pass through the fall of cleaning liquid or washing agent so that the air and dust pass through the water falls and the water falls pass through the air and dust as it follows its sinuous or tortuous path.

After the air and dust have traveled through the chamber 81 the dust is completely absorbed by the washing liquid thereby separating it from the air leaving the air unburdened and clean when it enters the chamber 20. The clean air is separated from the now combined water and dust in the area of the chamber 20 prior to its entering the clean air duct 35 which leads from the chamber 20 at a point remote from the stack 21 and can optionally travel through the inner stack 23 as shown in full lines or via the duct 35 as shown in dotted lines of Fig. 1.

In the event that the air is overburdened with impurities, dust or dirt, the amount of impurities, dust or dirt delivered to the chamber 81 may be reduced by the introduction of clean air from the chamber 20 via the duct 34 which is equipped with the sliding valve 96. It can be seen that the blower will readily accept the air under pressure in the chamber 20 via the duct 34 in preference to the air not under pressure in the ducts 86 thereby diminishing the delivery of air and impurities in the ducts 86 to the chamber 81. From the foregoing detailed description, the operation of the cleaning apparatus is obvious, the improved construction being simple and inexpensive to manufacture and requiring substantially no maintenance.

Although but one embodiment of the invention has been disclosed and described in detail, it is obvious that many changes may be made in the size, shape, arrangement and detail of the various elements of the invention without departing from the spirit and scope thereof as defined by the appended claim.

I claim:

An air washer comprising a tank, a hood over said tank, an outer stack rising upwardly from said tank adjacent one end thereof communicating through said hood, sludge baffles in said tank below the water level of said tank, foam baffles in said tank above the water level of said tank, an inner stack disposed concentrically in said outer stack communicating through said hood, means for delivering air to be washed to the space between said stacks at a tangent thereto, means for delivering water to the space between said stacks at a tangent thereto in the same direction as the air delivery, baffles on the inside of said outer stack, baffles on the outside of said inner stack; said stack baffles being staggered to churn said air and water into a foam to thoroughly wet the dirt particles in the air; said foam baffles being adapted to keep the foam in the area of said stacks between said tank and said hood; and a washed air tube leading from said inner stack to a point between said tank and hood beyond said foam baffles for conveying the washed air to said inner stacks free of foam.

DANIEL T. COLLINS.

REFERENCES CITED

The following references are of record in the file of this patent:

UNITED STATES PATENTS

| Number | Name | Date |
| --- | --- | --- |
| 283,025 | Rowan | Aug. 14, 1883 |
| 784,748 | Meehan | Mar. 14, 1905 |
| 931,229 | Sepulchre | Aug. 17, 1909 |
| 969,769 | Brassert et al. | Apr. 13, 1910 |
| 1,007,356 | Hopper | Oct. 31, 1911 |
| 1,313,971 | Wilson | Aug. 26, 1919 |
| 1,718,988 | Stewart | July 2, 1929 |
| 1,793,620 | Jacobus | Feb. 24, 1931 |
| 2,090,994 | Brandes | Aug. 24, 1937 |
| 2,171,574 | Lambert et al. | Sept. 5, 1939 |
| 2,195,707 | Nutting | Apr. 2, 1940 |

FOREIGN PATENTS

| Number | Country | Date |
| --- | --- | --- |
| 23,921 | Great Britain | Oct. 16, 1911 |